United States Patent
Buck et al.

(10) Patent No.: US 12,129,034 B2
(45) Date of Patent: Oct. 29, 2024

(54) CABIN PRESSURE CONTROL SYSTEM WITH SELECTION OF RATE OF CHANGE

(71) Applicant: Honeywell International Inc., Charlotte, NC (US)

(72) Inventors: David Buck, Oro Valley, AZ (US); Gerard McCoy, Tucson, AZ (US); Darrell W. Horner, Oro Valley, AZ (US)

(73) Assignee: Honeywell International Inc., Charlotte, NC (US)

( * ) Notice: Subject to any disclaimer, the term of this patent is extended or adjusted under 35 U.S.C. 154(b) by 224 days.

(21) Appl. No.: 17/326,655

(22) Filed: May 21, 2021

(65) Prior Publication Data

US 2022/0289391 A1 Sep. 15, 2022

Related U.S. Application Data

(60) Provisional application No. 63/158,734, filed on Mar. 9, 2021.

(51) Int. Cl.
*B64D 13/04* (2006.01)
*G05D 16/20* (2006.01)

(52) U.S. Cl.
CPC ........... *B64D 13/04* (2013.01); *G05D 16/202* (2013.01)

(58) Field of Classification Search
CPC ............ B64D 13/04; B64D 2013/0625; G05D 16/202
See application file for complete search history.

(56) References Cited

U.S. PATENT DOCUMENTS

| 2,620,719 | A | * | 12/1952 | Price | B64D 13/02 454/73 |
|---|---|---|---|---|---|
| 4,553,474 | A | * | 11/1985 | Wong | B64D 13/04 454/71 |
| 6,676,504 | B2 | | 1/2004 | Petri et al. | |
| 6,979,257 | B2 | | 12/2005 | Horner et al. | |
| 2010/0173575 | A1 | | 7/2010 | Horner et al. | |
| 2020/0298978 | A1 | * | 9/2020 | Horner | B64D 13/04 |

(Continued)

FOREIGN PATENT DOCUMENTS

| EP | 1965279 A2 | 9/2008 |
|---|---|---|
| EP | 3712069 A1 | 9/2020 |

OTHER PUBLICATIONS

Response to Extended Search Report dated Jul. 18, 2022, from counterpart European Application No. 22157208.4 filed Nov. 2, 2022, 29 pp.

(Continued)

*Primary Examiner* — Edelmira Bosques
*Assistant Examiner* — Brett Peterson Mallon
(74) *Attorney, Agent, or Firm* — Shumaker & Sieffert, P.A.

(57) ABSTRACT

A cabin pressure control and monitoring system includes an outflow valve and a manual control panel comprising a selector switch and configured to generate a signal, wherein a value encoded in the signal is dependent on a position of the selector switch. The cabin pressure control and monitoring system also includes a controller configured to receive the signal from the manual control panel, determine a target rate of change for a cabin pressure based on the value encoded in the signal, and control the outflow valve based on the target rate of change.

20 Claims, 7 Drawing Sheets

(56) References Cited

U.S. PATENT DOCUMENTS

2020/0298979 A1* 9/2020 Horner .................. B64D 13/04

OTHER PUBLICATIONS

Extended Search Report from counterpart European Application No. 22157208.4 dated Jul. 18, 2022, 10 pp.
Notice of Intent to Grant and Text Intended to Grant from counterpart European Application No. 22157208.4 dated Sep. 26, 2023, 9 pp.

* cited by examiner

CABIN PRESSURE CONTROL SYSTEM WITH SELECTION OF RATE OF CHANGE

The present application claims the benefit of U.S. Provisional Patent Application Ser. No. 63/158,734, filed on Mar. 9, 2021, the entire content being incorporated herein by reference.

TECHNICAL FIELD

The disclosure relates to aircraft cabin air pressure control.

BACKGROUND

Aircraft may have a pressurized cabin to provide comfort and sufficient oxygen to a flight crew as well as passengers. In some examples, bleed air from the aircraft engines, or an engine driven air pump, may provide pressure to the aircraft interior. An outflow valve (OFV) may be used to release pressure from inside the cabin to the atmosphere to keep the internal cabin pressure within a desirable range. Some aircraft are equipped with a cabin pressure control system (CPCS) to maintain the cabin pressure altitude to within a relatively comfortable range (e.g., below approximately 8,000 feet). The CPCS may automatically allow gradual changes in the cabin pressure altitude to keep passengers and crew comfortable and maintain a cabin-to-atmosphere differential pressure below nominal and maximum limits.

SUMMARY

In general, the disclosure is directed to a cabin pressure control system. The cabin pressure control system (CPCS) may include a selector switch that allows a user to choose a target rate of change for a cabin pressure. A controller may be configured to control an outflow valve to achieve the target rate of change for the cabin pressure. The CPCS of this disclosure may allow for a simple user interface so that a vehicle operator can control the cabin pressure with a reduced number of interactions, touches, or keystrokes.

The details of one or more examples of the disclosure are set forth in the accompanying drawings and the description below. Other features, objects, and advantages of the disclosure will be apparent from the description and drawings, and from the claims.

In some examples, a cabin pressure control and monitoring system includes an outflow valve and a manual control panel comprising a selector switch and configured to generate a signal, wherein a value encoded in the signal is dependent on a position of the selector switch. The cabin pressure control and monitoring system also includes a controller configured to receive the signal from the manual control panel, determine a target rate of change for a cabin pressure based on the value encoded in the signal, and control the outflow valve based on the target rate of change.

In some examples, a method for controlling cabin pressure includes receiving a signal from a manual control panel, wherein a value encoded in the signal is dependent on a position of a selector switch. The method also includes determining a target rate of change for a cabin pressure based on the value encoded in the signal. The method further includes controlling an outflow valve based on the target rate of change.

In some examples, a device includes a computer-readable medium having executable instructions stored thereon, configured to be executable by processing circuitry for causing the processing circuitry to determine a target rate of change for a cabin pressure based on a value encoded in a signal received from a manual control panel, wherein the value encoded in the signal is dependent on a position of a selector switch of the manual control panel. The instructions are configured to be executable by the processing circuitry for further causing the processing circuitry to control an outflow valve based on the target rate of change.

DETAILED DESCRIPTION

Figure 1:
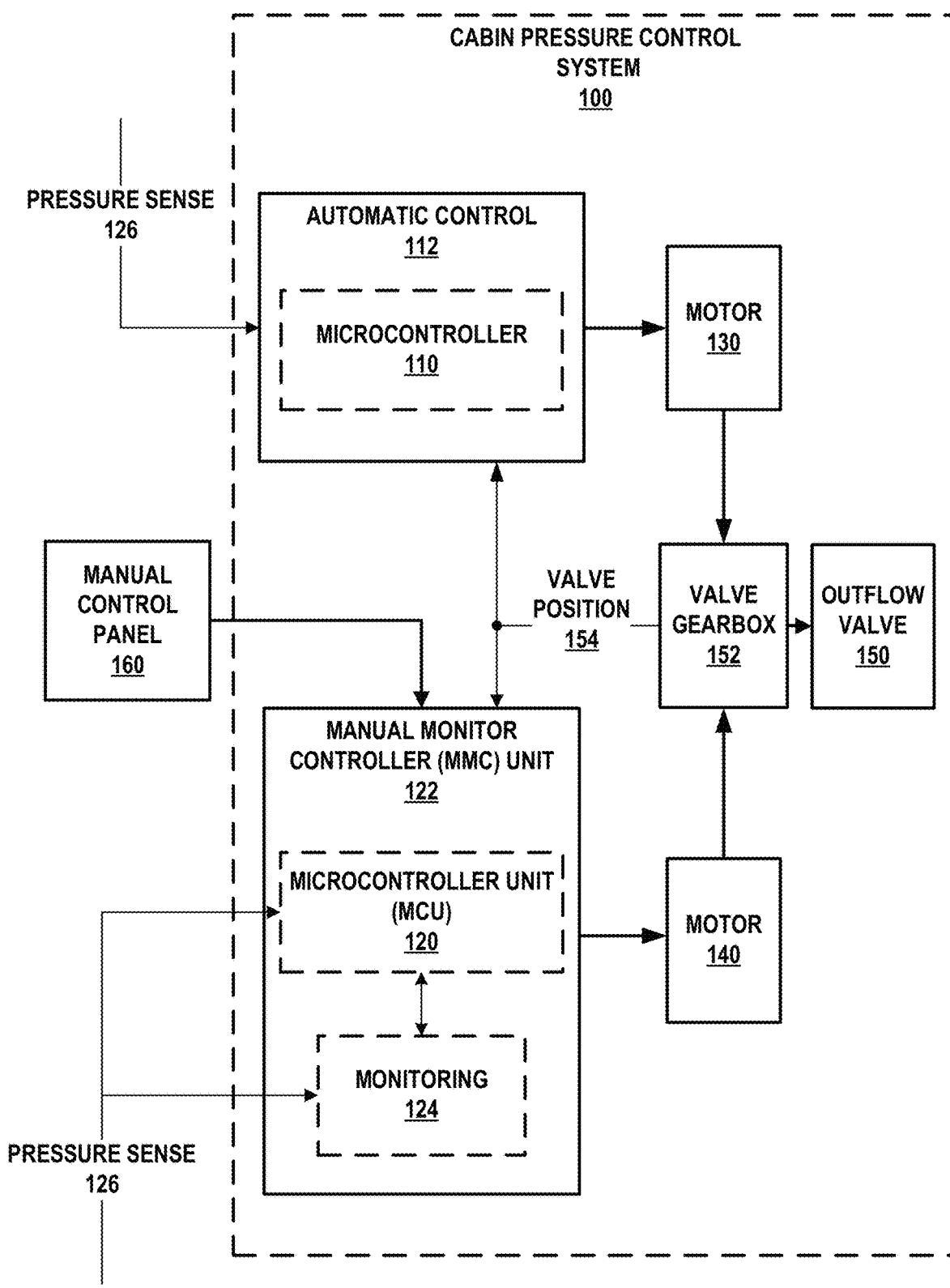
FIG. 1 is a block diagram illustrating an example of a CPCS according to one or more techniques of this disclosure.

Some types of all-electric cabin pressure control system (CPCS) may be configured to implement various techniques to provide "manual" control in response to a fault in the automatic control portion of the CPCS. In a first example, after a fault in the automatic pressure control system, the outflow valve (OFV) may remain in its last position because of the gear box design. A second or third manual controlled motor on the OFV may be operated by a switch in the flight deck to open or close the OFV.

When the OFV is in its fixed position, the actual cabin altitude can drift or fluctuate as a result of fresh air inflow changes, airplane altitude changes, engine power setting changes or other conditions that can change the cabin altitude. For example, for a vehicle set to maintain a given course and altitude, the autopilot may make regular small changes in the engine power settings. Small changes in the power settings may cause the bleed air pressurization system, or a separate air compressor, used to pressurize the cabin to change how the system pressurizes the cabin. When the automatic portion of the CPCS is operating, the CPCS may change the motor position that adjusts the OFV position to compensate for these power setting, or other changes in the cabin air pressure. However, with a fixed manual control system, the operator may have to activate the manual control of the valve frequently, which may distract the operator from other aspects of operating the vehicle.

The cabin altitude expresses the cabin pressure in terms of an equivalent atmospheric altitude. For example, a cabin altitude of zero (i.e., sea level) means that the cabin pressure is equal to the atmospheric pressure at sea level, which is approximately 14.7 psia, 1 bar, 100 kilopascals, or 760 mmHg. A cabin altitude of 5,000 feet means that the cabin pressure is equal to the atmospheric pressure at an altitude of 5,000 feet, which is approximately 12.2 psia, 0.54 bar, 54 kilopascals, or 410 mmHg.

A CPCS may include redundant systems and safety features to prevent over pressurization or under pressurization of the cabin. In some examples, a vehicle may have back-up electronics, two outflow valves, may have one or more safety valves and may have fault detection to switch the automatic control to manual control by the flight crew. Additional example details of redundant CPCS are described in commonly assigned U.S. Patent Application Publication Number 2020/0298978, entitled "Dissimilar Microcontrollers for Outflow Valve," filed on Mar. 22, 2019, U.S. Patent Application Publication Number 2020/0298979, entitled "Cabin Pressure Control System with All-Electric OFV, Using Dis-Similar Manual Control that Performs Cabin Altitude Hold Function," filed on Feb. 28, 2020, the entire contents of each of which are incorporated herein by reference.

In a second example, a backup motor (sometimes used by the automatic control system) may be controlled by a control unit, utilizing inputs from the vehicle operator for selected cabin altitude or selected cabin altitude rate of change. This system may require flight deck analog or digital interfaces to the CPCS. For example, the manual control of the CPCS may be implemented by adding softkeys or controls to the multi-function display (MFD) or other controls and/or displays on the flight deck. Integrating the CPCS manual controls into one or more other flight deck systems may take flight deck area, e.g. a flight crew may be required to switch back and forth between screen views for the CPCS controls. Integrating CPCS manual controls into other flight deck systems may require custom installations and may be expensive relative to the first method described above. Different operators and manufacturers may seek different methods to implement manual CPCS interface, which may add system integration costs during the development of an airplane.

In other examples, a pneumatic system may be used. In the pneumatic system, when the auto control fails, the cabin altitude may be "held" until the user manually adjusts the cabin altitude using a pneumatic valve. Pneumatic systems may have some undesirable features such as being more expensive, more difficult to install, and utilizing pneumatic tubing from the flight deck to control the outflow valve. The pneumatic tubing may have reliability issues, such as leakage, may be significantly heavier than wiring and the pneumatic switches may not be as reliable as all-electric manual control.

In another example, an electro-pneumatic system may be used. In the electro-pneumatic system, when auto control fails, the system can hold the cabin altitude without a user adjusting of the cabin altitude. This system may have the undesirable feature that the system may not change the cabin altitude when the altitude of the vehicle changes. For example, the vehicle operator may desire to maneuver the vehicle to a higher or lower altitude without reaching an altitude limitation. In addition, when the cabin altitude is held steady, the vehicle operator may "fly through the cabin" during a descent. This can force the operator to perform a commanded depressurization of the cabin prior to landing. This example system can also prevent easy opening or closing of the valve on ground for maintenance purposes.

In contrast to the pneumatic system, or softkey controls in the MFD, the system of this disclosure provides all-electric manual control of the OFV, using simplified controls (a simple electrical selector switch), such that after an automatic control failure, the cabin altitude is "held" until the user manually adjusts it to increase or decrease according to the climb or descent rate setting, or open or close the valve according to the switch setting—for example during ground maintenance. The closed-loop control to maintain the cabin pressure and/or the rate of change is independent from the automatic pressure control system. The manual control panel of the system of this disclosure may include a simple, intuitive interface that reduces operator workload by reducing the need to either pay close attention to the cabin pressure or to switch back and forth between other flight deck controls to monitor the cabin pressure. Further, the operator may control the cabin altitude higher or lower for the comfort of the passengers or to create a desired differential pressure.

A system of this disclosure may include a selector switch that allows a user to select a rate of increase or a rate of decrease of the cabin pressure. In contrast, an existing system may allow the user to open or close the outflow valve, without any closed-loop control of an increase or decrease in the cabin pressure. Using the system of this disclosure, the user may be able to command, for example, a five hundred feet per minute decrease in the cabin altitude until the cabin pressure reaches a desirable level. In the existing system, the user would command a closing of the outflow valve to increase the cabin pressure until the pressure reached a desirable level, at which time the user can command a hold on the cabin pressure.

The selector switch may be easier and/or more intuitive to use than previous input devices. For example, a vehicle operator may be able to operate the selector switch while diverting less attention away from other vehicle operations. The selector switch may provide tactile indication to a user, allowing the user to easily set the selector switch to the desired setting. The selector switch may have a simple design but provide more fine-tuned control than existing input devices. Thus, a system including a selector switch may include improved user experience and improving user control.

In this disclosure, any space within an aircraft, or similar vehicle, may be monitored and controlled by a CPCS of this disclosure. Some examples of spaces within a vehicle may include an aircraft cabin, a cockpit, control booth, a hold or storage space of a vehicle, and similar spaces. In some examples, a vehicle cabin may include seating for a passengers as well as locations for cargo. In some examples a cockpit or control booth may be where a vehicle operator, such as a flight crew, controls the operation of the vehicle. In this disclosure, any reference to controlling cabin pressure may also refer to controlling cockpit pressure, or any other space within a vehicle, unless otherwise specifically noted.

FIG. 1 is a block diagram illustrating an example of a CPCS according to one or more techniques of this disclosure. CPCS 100 may be part of an aircraft such as an airplane, a helicopter, or a weather balloon. Alternatively, CPCS 100 can be part of a space vehicle such as a satellite or spaceship. Although the systems of this disclosure are described in the context of aircraft, the systems of this disclosure may apply to any type of vehicle.

In the example of FIG. 1, CPCS 100 controls and monitors the pressure of a fluid in a cabin. The cabin may be the passenger compartment of a vehicle, such as the galley and/or cockpit of an aircraft, which is filled with air. Air pressure is related to air density, so human lungs work harder at lower air pressures, as compared to higher air pressures, to ingest enough oxygen. Thus, for the occupants of the cabin, it is important to maintain a sufficiently high fluid pressure (e.g., air pressure). CPCS 100 can also include one or more sensors for sensing the pressure of the fluid in the cabin, or for sensing the atmospheric pressure outside of the cabin. The pressure sensors may send one or more pressure sense signals 126 to manual monitor controller (MMC) unit 122 and automatic control unit 112. In some examples, pressure sense signals 126 may be implemented by tubing, or similar structure, that may connect the cabin directly to a pressure transducer, which converts the pressure to an electrical signal. In other examples, a pressure sensor may measure the cabin pressure and send an electrical signal indicating the measured pressure to MMC unit 122 and automatic control unit 112.

CPCS 100 may also receive valve position signals 154 from valve position circuitry within valve gearbox 152 for sensing the position of OFV 150. The airplane may also include an inflow valve for allowing fluid to flow into the cabin, e.g. from an engine bleed air system or other such system (not shown in FIG. 1).

Microcontroller 110, via automatic control unit 112, automatically controls the pressure of the fluid in the cabin based on a sensed cabin pressure. Automatic control unit 112 may operate with a closed feedback loop. Microcontroller 110 can receive a signal indicating the cabin pressure and determine whether to open or close OFV 150 based on the signal. Microcontroller 110 may be configured to deliver signals to a motor driver that controls the operation of first motor 130. Additional example details of motors for controlling outflow valve are described in commonly assigned U.S. Pat. No. 6,979,257, entitled "Cabin Pressure Control Method and Apparatus Using All-Electric Control Without Outflow Valve Position Feedback," issued on Dec. 27, 2005, the entire contents of which are incorporated herein by reference.

Microcontroller 110 can also receive a pressure sensor signal 126 indicating the pressure of the fluid and control motor 130 based on the pressure sensor signal 126. In examples in which the pressure sensor signal indicates that the cabin pressure is greater than an upper threshold, microcontroller 110 can control motor 130 to open OFV 150 to release fluid and lower the cabin pressure. In examples in which the pressure sensor signal indicates that the cabin pressure is less than a lower threshold, microcontroller 110 can control motor 130 to close OFV 150 to prevent the release of fluid from the cabin. Microcontroller 110 can also be coupled to an avionics system of the aircraft to receive control signals from the avionics.

Microcontroller unit (MCU) 120, of MMC unit 122, controls the pressure of the fluid in the cabin based on user inputs using the manual control panel 160. Manual control panel 160 may include any type of electrical selector switch configured to receive user input by turning a knob and/or touching a screen. In some examples, CPCS 100 may include a first selector switch that allows for a user to select to hold the cabin, increase or decrease cabin pressure by selecting a climb or descent rate, or open and close the valve by selecting respective options. CPCS 100 may also include a second switch that allows the user to select a dump operation, which may include a fast decrease in cabin pressure. MMC unit 122 can open or close OFV 150 based on the status of the first switch. MMC unit 122 may open the OFV 150 in response to detecting that the user has actuated the dump switch. MMC unit 122 may be configured to refrain from driving motor 140 in response to detecting that manual control panel 160 does not indicate that the user selected manual operation.

In some examples, microcontroller 110 and MCU 120 may include computer readable storage in the form of a memory. In other examples, microcontroller 110 and MCU 120 may also be operatively connected to a memory external to microcontroller 110 or MCU 120 (not shown in FIG. 1). Either internal or external memory may include programming instructions for the processing circuitry within microcontroller 110 and MCU 120. The memory may also store and retrieve data, values, flags, setpoints, etc. that may be used by microcontroller 110 and MCU 120.

A type of microcontroller 110 may be different than a type of MCU 120 to reduce the likelihood of a common failure for microcontroller 110 and MCU 120 for the same common reason, such as manufacturing process defect, an actual design defect, or from an external influence such as exposure to temperature, radiation, vibration, or power interrupts. The type of microcontroller 110 refers to the manufacturer, the model number, the design, the manufacturing facility, the software compiler, the operating system, pin count, logic family (e.g., complementary metal-oxide-semiconductor (CMOS) or transistor-transistor logic (TTL)), and/or the register size (e.g., eight or sixteen bits) of microcontroller 110. Thus, the manufacturer or brand name of microcontroller 110 may be different than the manufacturer or brand name of MCU 120. Additionally or alternatively, the operating system of microcontroller 110 may be different than the operating system of MCU 120. In some examples, microcontroller 110 can operate independently of MCU 120 so that if one of microcontroller 110 and MCU 120 fails, the remaining microcontroller can still control outflow valve 150. Independent operation can include microcontroller 110 and MCU 120 having separate power supplies, separate pressure sensors, separate circuit boards, and/or galvanic isolation between microcontroller 110 and MCU 120.

In some examples, MCU 120 receives a different power supply than microcontroller 110 to reduce the likelihood of a common failure for microcontroller 110 and MCU 120. Different power supplies for each of microcontroller 110 and MCU 120 can reduce the likelihood that both of microcontroller 110 and MCU 120 fail at the same time, for the same common reason, such as a manufacturing or design defect of the power supply electrical device itself, or a design implementation defect of the integrated electrical design, or an external influence such as temperature exposure. The power supplies may be independent of each other by, for example, using different power sources (e.g., different batteries or generators) and different aircraft supplied power buses.

Motors 130 and 140 are configured to control the position of OFV 150. Each of motors 130 and 140 may be able to open or close OFV 150. In some examples, motor 130 includes a brushless direct-current (BLDC) motor, and motor 140 includes a brushed direct-current (BDC) motor. However, either of motors 130 and 140 may include a BLDC motor, a BDC motor, a stepper motor, and/or an inductive motor. Each of motors 130 and 140 can control OFV 150 through a single, shared actuator or valve gearbox 152. Valve gearbox 152 may be configured as a differential gear box such that either or both of motors 130 and 140 may control the position of OFV 150.

The motor drive electronics for motor 130 may be separate and dissimilar from the motor drive electronics for motor 140 to reduce the likelihood that both motor drive electronics fail at the same time. For example, the type, brand, design, and other characteristics of the motor drive electronics for motor 130 may be different than the type, brand, design, and other characteristics of the motor drive electronics for motor 140. The motor drive electronics may include a multiphase inverter for delivering power to motor 130 and/or 140.

OFV 150 can release fluid from the cabin based on the state of OFV 150. For example, OFV 150 can include a butterfly valve that can rotate to increase or decrease the fluid flow rate through OFV 150. OFV 150 may be positioned within the bulkhead of an aircraft and may be in flow communication with the cabin air and the outside ambient atmosphere. A position sensor in valve gearbox 152 may sense the position of OFV 150. In other examples, position sensor near OFV 150 can sense the position of OFV 150 and deliver a signal 154 to microcontroller 110 and/or 120.

MMC unit 122 of CPCS 100 may include a closed-loop system to adjust the cabin pressure or adjust the cabin pressure rate of change based on a feedback pressure signal when in manual mode. The manual mode closed-loop system is independent from the pressure control system in automatic control unit 112. Manual control panel 160 may include an electric selector switch configured to provide a number of (e.g., three) electrical connections to control electric motor 140 and thereby control OFV 150. The processing circuitry of MMC unit 122, i.e. MCU 120, may be configured to receive data transmitted along the electrical connections, where the data may codify the electrical selector switch input into a specific command or mode of operation. The processing circuitry of MMC unit 122, i.e. MCU 120, may be configured to receive a pressure sense signal 126 indicating a pressure of the cabin, via monitoring circuitry 124. Monitoring circuitry 124 may contain circuitry configured to convert the pressure sense signal 126 into an electrical signal, pressure limiting circuitry, and an override function to ensure cabin pressure does not drop below a predetermined threshold.

In response to the alternate position mode switch in manual control panel 160 being set to the manual position, and the electrical selector switch in manual control panel 160 resting in the hold position, MCU 120 may determine the commanded target first pressure of the cabin when the electric switches were set to the manual and hold positions using a typical MCU operational cycle by cycle sample (of the pressure sense signal 126) and then hold (of the pressure signal 126) method. MCU 120 may send electric signals to motor driver circuitry for motor 140 to control motor 140 to maintain the pressure of the cabin at the set pressure by controlling the position of OFV 150. MCU 120 may be configured to maintain the cabin at the first pressure (targeted pressure) within a threshold range, such as plus or minus 0.23 kilopascals, or in some examples, plus or minus 70 feet of altitude.

In response to determining that the alternate position mode switch in manual control panel 160 is set to the manual position, and the electrical selector switch in manual control panel 160 is resting in the hold position, MCU 120 may determine the commanded target first pressure of the cabin. MCU 120 can determine the pressure when the electric switches were set to the manual position and to the hold position using a typical MCU operational cycle by cycle sample (of the pressure sense signal 126) and then hold (of the pressure signal 126) method. MCU 120 may send electric signals to motor driver circuitry for motor 140 to control motor 140 to maintain the pressure of the cabin at the set pressure by controlling the position of OFV 150. MCU 120 may be configured to maintain the cabin at the first pressure (targeted pressure) within a threshold range, such as plus or minus 0.23 kilopascals, or in some examples, plus or minus 70 feet of altitude.

In response to the alternate position mode switch in manual control panel 160 being set to the manual position, and the electrical selector switch in manual control panel 160 resting in the slow climb position, MCU 120 may determine the predetermined commanded target first pressure rate of change of the cabin when the electric switches were set to the manual and slow climb positions. MCU 120 can use a typical MCU operational cycle by cycle sample (of the pressure sense signal 126) and then rate control (of the pressure signal 126) method. MCU 120 may send electric signals to motor driver circuitry for motor 140 to control motor 140 to maintain the predetermined pressure rate of change of the cabin at the set pressure by controlling the position of OFV 150. MCU 120 may be configured to maintain the cabin pressure rate of change at the first predetermined pressure rate of change (targeted pressure rate of change), such as an increase of approximately five hundred feet per minute. MCU 120 can keep the decrease rate in pressure within a threshold range, such as plus or minus 0.27 kilopascals per minute, or in some examples, plus or minus 75 feet per minute of altitude change rate.

In the same manner, in response to the alternate position mode switch in manual control panel 160 being set to the manual position, and the electrical selector switch in manual control panel 160 resting in the fast climb position, MCU 120 may determine the predetermined commanded target second pressure rate of change of the cabin when the electric switches were set to the manual and fast climb positions. MCU 120 can use a typical MCU operational cycle by cycle sample (of the pressure sense signal 126) and then rate control (of the pressure signal 126) method. The target rate of increase of the fast climb position setting may be approximately one thousand feet per minute.

In the same manner, slow descent and fast descent selector switch position and manual switch position may maintain the cabin pressure rate of change at the third and fourth predetermined pressure rates of change (targeted pressure rates of change). The target rate of increase of the slow descent position setting may be approximately three hundred feet per minute. The target rate of increase of the fast descent position setting may be approximately seven hundred feet per minute. These rates of changes are described merely as examples, and other rates of change can be used in addition or as an alternative to the rates described herein.

In response to the alternate position mode switch in manual control panel 160 being set to the manual position, and the electrical selector switch in manual control panel 160 resting in the OFV open position, MCU 120 may determine the predetermined commanded motor voltage and polarity when the electric switches were set to the manual and OFV open positions using a typical MCU operational control of the pulse width modulation (PWM) control method. MCU 120 may send electric signals to motor driver circuitry for motor 140 to control motor 140 to maintain the predetermined motor voltage and polarity at the set voltage and polarity by controlling the speed and direction of OFV 150. MCU 120 may be configured to maintain the commanded motor voltage at the first predetermined motor voltage within a threshold range, such as plus or minus 0.3 volts DC. MCU 120 may also monitor the pressure sensor 126 to compare the actual cabin pressure against a predetermined cabin pressure, and set the commanded motor voltage to zero volts DC, when the actual cabin pressure is less than the predetermined cabin pressure, such as a pressure associated with an altitude of 13,500 feet.

In response to the alternate position mode switch in manual control panel 160 being set to the manual position, and the electrical selector switch in manual control panel 160 resting in the OFV close position, MCU 120 may determine the predetermined commanded motor voltage and polarity when the electric switches were set to the manual and OFV close positions using a typical MCU operational control of the pulse width modulation (PWM) control method. MCU 120 may send electric signals to motor driver circuitry for motor 140 to control motor 140 to maintain the predetermined motor voltage and polarity at the set voltage and polarity by controlling the speed and direction of OFV 150. MCU 120 may be configured to maintain the commanded motor voltage at the first predetermined motor voltage within a threshold range, such as plus or minus 0.3 volts DC.

The system of this disclosure may include a cabin altitude "hold," cabin altitude rate of change, and OFV open and OFV closed functions after failure of automatic CPCS control, using a separate, dissimilar control means from automatic control. Other examples of all-electric systems may not have a hold, cabin altitude rate of change, and OFV open and OFV closed functions when in manual mode, or may have more complex controls in the flight deck to select cabin altitude or cabin altitude rate of change during semi-automatic control.

The system of this disclosure may provide technical benefits compared to existing systems. For example, an operator may not have to divert attention to maintaining the cabin altitude because the closed-loop feature of the manual system may be configured to hold the cabin altitude or command a change to the cabin altitude even without user interaction. Furthermore, the system uses a simple flight deck selector switch (what many all-electric systems already include), instead of complex flight deck controls to manually select the cabin altitude or cabin altitude rate of change, which may have cost and weight benefits.

Cost benefits may also result from a selector panel (e.g., an electrical selector switch), no additional weight (which has a fuel savings cost impact), and no added engineering costs to develop the flight deck selector panel. Finally, the system of this disclosure may have cost, weight, and reliability advantages over electro-pneumatic systems that may include a hold and cabin pressure rate of change function.

Figure 2A:
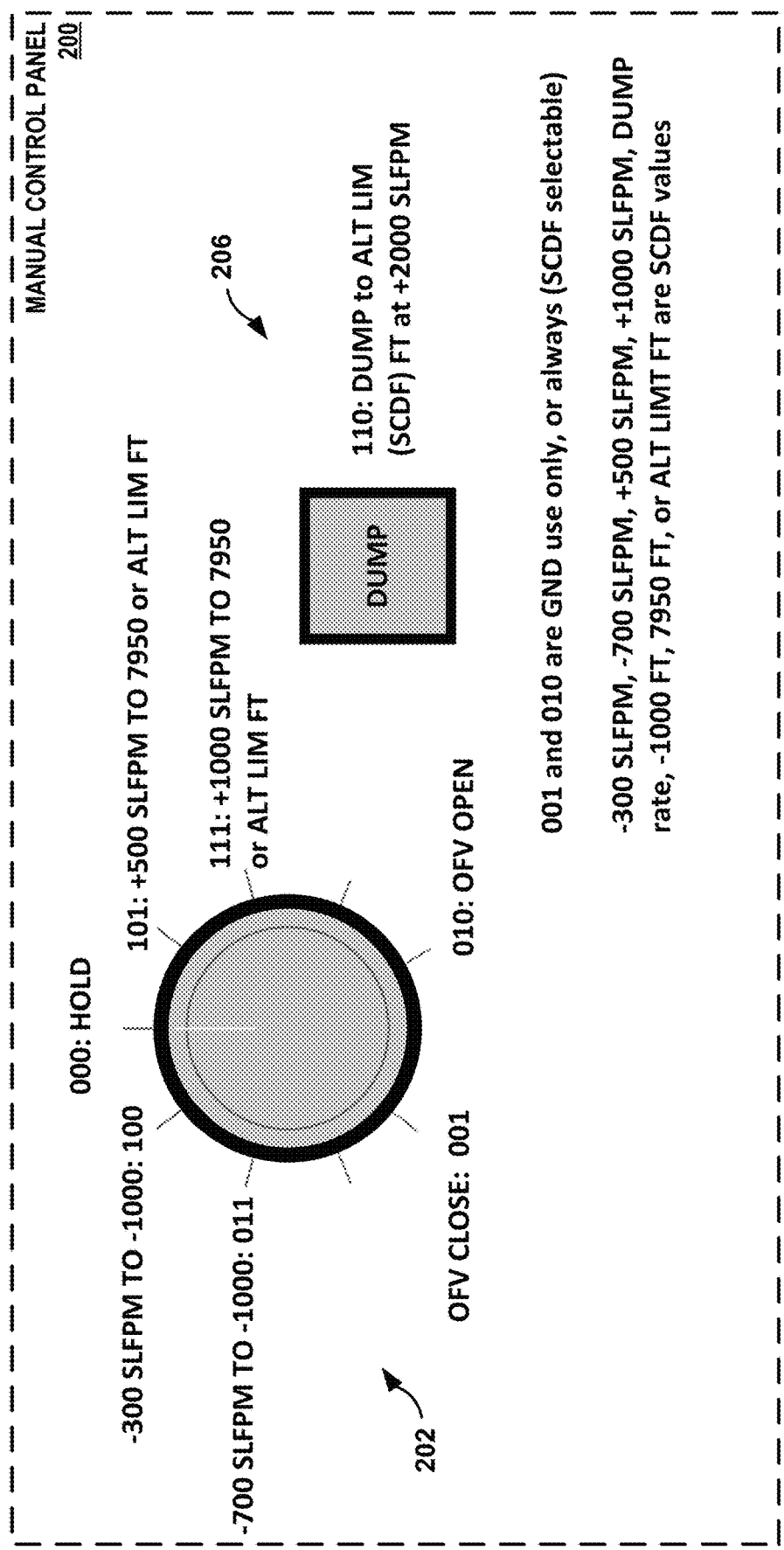
FIG. 2A is a conceptual diagram illustrating an example manual control panel, according to one or more techniques of this disclosure.

FIG. 2A is a conceptual diagram illustrating an example manual control panel according to one or more techniques of this disclosure. Manual control panel 200 is an example implementation of manual control panel 160 described above in relation to FIG. 1. In the example shown in FIG. 2A, manual control panel 200 includes multi-position selector switch 202 that allows a user to manually set the position of an outflow valve. The user can manually set the position of the outflow valve by turning the knob to the positions marked OFV close (001) or OFV open (010). Multi-position selector switch 202 may also allow a user to select a variety of cabin altitude rates of change. The user can select a cabin altitude rate of change by turning the knob to the positions marked 011, 100, 101, or 111. In addition, multi-position selector switch 202 may allow a user to select the cabin altitude to be held at a present level by turning the knob to the position marked hold (000).

Manual control panel 200 may include a selector switch 202 and a dump switch 206. Although not shown in FIG. 2A, manual control panel 200 may include a mode button with a fault indicator as well as a manual indicator. In response to a fault signal from the automatic pressure control unit, the fault indicator may illuminate. The vehicle operator may then press, or otherwise activate the manual mode, which may cause the manual indicator (MAN) to illuminate and activate selector switch 202. Selector switch 202 may include a rotary switch, such as a three-deck rotary switch, configured to send a combination of signals to an MMC unit, e.g. MMC unit 122 described above in relation to FIG. 1.

In some examples, selector switch 202 does not include a spring-loaded mechanism that returns selector switch 202 to a default setting, such as a setting that maintains a cabin altitude. In response to a user moving selector switch 202 to a particular setting, selector switch 202 may remain at the particular setting until the user moves selector switch 202 again. In examples in which the particular setting is a climb or descent setting, the control system may be configured to cause the cabin pressure to increase or decrease until the cabin pressure reaches a pressure limit. In response to determining that the cabin pressure has reached a pressure limit, the control system may be configured to override the manual control and keep the cabin pressure at the pressure limit.

When a flight crew member rotates the control knob of selector switch 202 to the OFV open position, the signal to the MMC unit may cause an electric motor to cause an OFV, e.g. OFV 150 described above in relation to FIG. 1, to move to a more open position, thereby releasing cabin pressure. When a flight crew member moves control knob of selector switch 202 to the OFV close position, the signal to the MMC unit may cause an electric motor to cause the OFV, to move to a more closed position, thereby preventing cabin pressure from being released. When a flight crew member moves the control knob of selector switch 202 to the hold position, the signal to the MMC unit may activate closed-loop control of the cabin pressure. The closed-loop control may maintain the cabin pressure at a pressure setpoint by receiving an indication of cabin pressure from the pressure sensor and operating the OFV to maintain that cabin pressure. In some examples, the cabin pressure setpoint may be set dynamically, e.g., the setpoint may be the measured pressure at the time the flight crew released the valve control knob to the hold position.

Each of the four settings for slow climb, fast climb, slow descent, and fast descent may be associated with a predefined rate of change. For example, the slow climb position setting may be associated with an increase in cabin altitude of five hundred feet per minute or a decrease in pressure of roughly 1,800 pascals per minute. In response to receiving a signal from a selector switch 202, a controller can determine a setting and the predefined rate of change associated with the determined setting.

When a flight crew member moves the control knob of selector switch 202 to the slow climb position, the signal to the MMC unit may activate closed-loop control of the cabin pressure rate of change in the depressurization direction. The closed-loop control may control the cabin pressure rate of change at a predetermined cabin pressure rate of change setpoint by receiving an indication of cabin pressure rate of change from the pressure sensor and operating the OFV to maintain that cabin pressure rate of change. The closed-loop control may include a cabin pressure limit which limits the authority of the MMC to prevent depressurization beyond the predetermined cabin pressure limit, such as a pressure associated with 13,500 feet.

When a crew member moves the control knob of selector switch 202 to the fast climb position, the signal to the MMC unit may activate closed-loop control of the cabin pressure rate of change in the depressurization direction. The closed-loop control may control the cabin pressure rate of change at a predetermined cabin pressure rate of change setpoint by receiving an indication of cabin pressure rate of change from the pressure sensor and operating the OFV to maintain that cabin pressure rate of change. The closed-loop control may include a cabin pressure limit which limits the authority of the MMC to prevent further depressurization beyond the predetermined cabin pressure limit, such as a pressure associated with 13,500 feet.

A similar process can be used for slow descent and fast descent, using a predetermined cabin pressure limit above which the cabin pressure would be too high under all operating circumstances, which may be applicable for increasing cabin pressures. The predetermined limit may be set to −2,300 feet, or 110 kilopascals. As one example, a user may control the knob of selector switch 202 to the setting associated with slow descent. Manual control panel 200 can send a signal that is dependent on or corresponds to the setting of control knob of selector switch 202 to a controller, and the controller may be configured to determine a current, initial cabin pressure. If the initial cabin pressure is 75 kilopascals, which is associated with a cabin altitude of approximately eight thousand feet, the controller may determine that the cabin altitude should decline by three hundred feet per minute, or ten feet per second, which is associated with a rate of pressure increase of approximately 1,090 pascals per minute.

The controller may be configured to determine whether the actual rate of pressure increase is achieving the target rate of change, within some acceptable tolerance. For example, 100 milliseconds after receiving the signal from control knob of selector switch 202 indicating that the user has selected a slow descent position setting, the controller can compare the actual cabin pressure rate of change to a target cabin pressure rate of change, such as 1,090 pascals per minute, which is determined each computational frame by differentiating the actual cabin pressure. The closed-loop control may include a cabin pressure limit which limits the authority of the MMC to prevent pressurization beyond the predetermined cabin pressure limit, such as a pressure associated with an altitude −2,300 feet In this manner, the controller may pressurize the cabin until it achieves the predetermined limit, such as a pressure associated with an altitude −2,300 feet, or the differential pressure between the cabin pressure and the outside ambient pressure exceeds the threshold limit of the positive differential pressure limiting valve.

Dump switch 206 may also include a guard to prevent accidental actuation of the dump feature. When dump switch 206 is activated, a combination of signals may be received by the MMC, and the OFV may be controlled by the MMC, equalizing the pressure inside the cabin towards the outside air pressure at a constant rate of change, and limited in pressure to a predetermined pressure limit, such as 13,500 feet. The dump switch may be activated during flight, for example, to clear smoke, or after landing an aircraft with an automatic control system fault, for example, to depressurize the fuselage enough to safely open doors.

In some examples a CPCS of this disclosure may include a ditch switch, even though a ditch switch is not shown in FIG. 2A. A ditch switch may cause the OFV to close completely, which may prevent water from entering the cabin in the event of an emergency water landing.

Figure 2B:
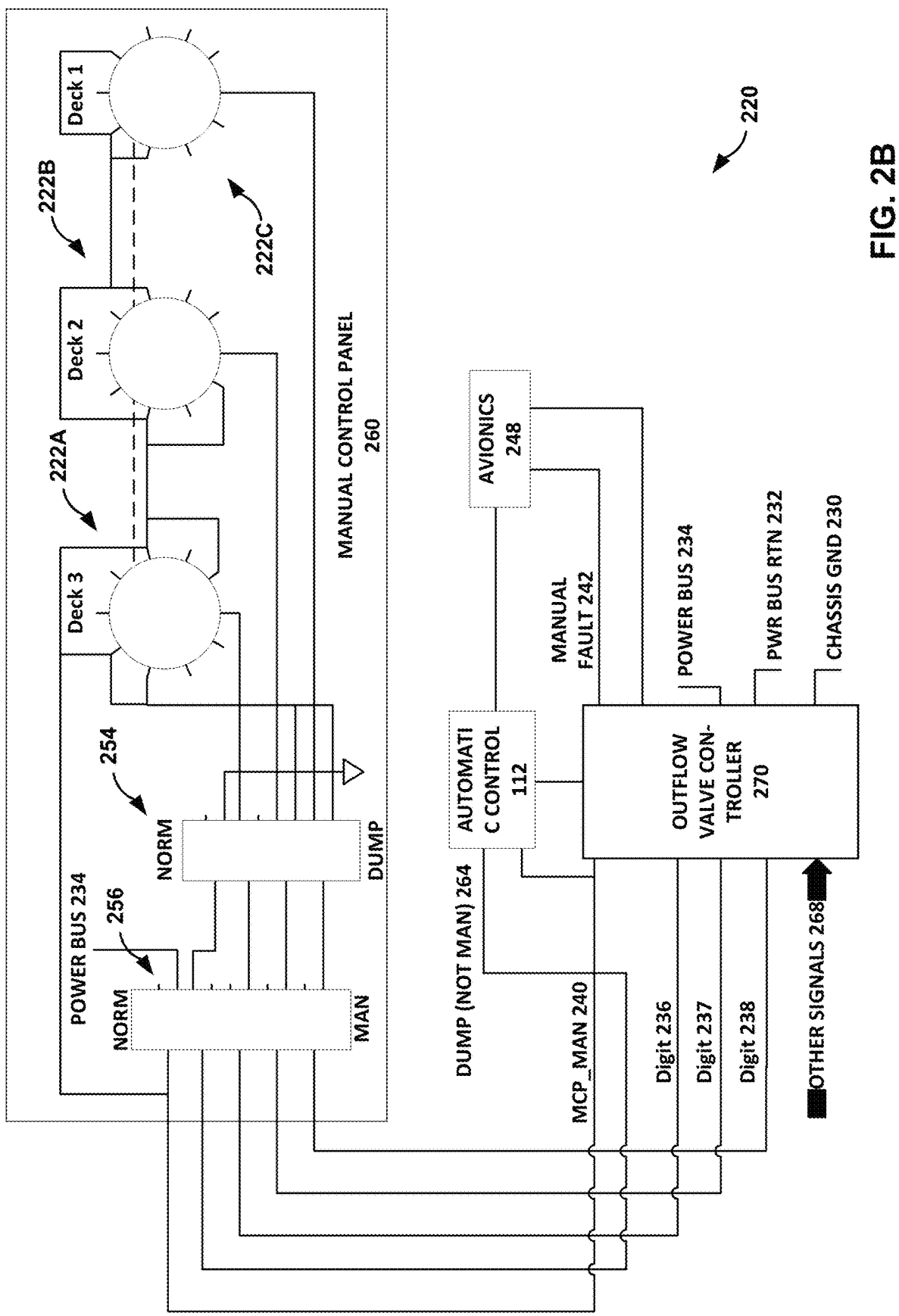
FIG. 2B is a schematic diagram illustrating an example controller configured to receive a digital signal from a manual control panel, according to one or more techniques of this disclosure.

FIG. 2B is a schematic diagram illustrating an example manual control panel 260 and CPCS 220 according to one or more techniques of this disclosure. CPCS 220 is an example of CPCS 100 described above in relation to FIG. 1. Manual control panel 260 is an example schematic implementation of manual control panel 160 and manual control panel 200 described above in relation to FIGS. 1 and 2A respectively.

In the example of FIG. 2B, manual control panel 260 is configured such that a flight crew of the aircraft has access to and controls the electric switches on manual control panel 260.

As depicted in FIG. 2B, selector switch 222, the normal-dump switch 254, and normal-manual switch 256 combine together to provide combinations of signals to the OFV controller 270 and automatic control unit 112. In addition, normal-manual switch 256, when set to the manual position, may cause manual control panel 260 to provide electrical power to selector switch 222. When normal-manual switch 256 is set to a normal position, manual control panel 260 may be configured to not supply power to selector switch 222. Selector switch 222 may be configured as a rotary position switch with at least seven electrical contact positions and three switch decks (shown as 222A, 222B, and 222C in FIG. 2B). The switch decks 222A, 222B, and 222C operate from the same rotary switch 222 shaft, such that the switch decks 222A, 222B, and 222C rotate with the selector switch 222 knob rotation. The decks 222A, 222B, and 222C of selector switch 222 may multiply each switch position to create three electrical signals represented by digit 236, digit 237, and digit 238 for each switch position. Manual control panel 260 may be configured to transmit digits 236-238 as a set of bits in parallel across separate channels or in series along a single channel. The value encoded in digits 236-238 may depend on and/or correspond to the setting or position of selector switch 222.

When normal-manual switch 256 is activated, the switch connections move from the normal position in which automatic control unit 112 monitors and controls cabin pressure, to manual mode, in which the manual control panel selects the mode of manual operation. The control knob of selector switch 222 may be set to a number of manual control modes of operation. Once selector switch 222 is set to the hold position, the closed-loop pressure control of the MMC unit maintains the cabin pressure, while in flight. In some examples, functions of the MMC unit, e.g. MMC unit 122 described above in relation to FIG. 1, may be included in OFV controller 270. The MCP_MAN signal 240 may indicate to automatic control unit 112 and OFV controller 270 that CPCS 220 is in manual mode.

OFV controller 270 and automatic control unit 112 may also be in communication with avionics 248. OFV controller 270 may, for example communicate one or more faults to avionics 248, such as manual fault 242.

As described above in relation to FIG. 1, moving selector switch 222 to the OFV open position sends an encoded signal including digits 236-238 to OFV controller 270, releasing cabin pressure. Moving selector switch 222 to the OFV close position sends an encoded signal including digits 236-238 to OFV controller 270, moving the OFV to a more closed position and reducing the rate of releasing cabin pressure.

Moving the guard and activating dump switch 254 may cause the switch connections of dump switch 254 to move from the normal position to the dump position, which sends a dump signal 264 to automatic control unit 112, which can control the operation of the OFV via OFV controller 270. If CPCS 220 is in manual mode, activating the dump switch causes a combinations of digits 236-238 to open the OFV and control a fast depressurization to a cabin pressure limit by sending an encoded signal via digits 236-238 to the OFV controller 270. OFV controller 270 may receive other indications and signals 268 from the aircraft. Some examples may include landing gear sensors, limit signals, and similar signals.

In manual operation, when the airplane is in flight, the OFV is controlled by the independent manual/monitor controller for a number of modes or functions, including to: hold the cabin to an approximately constant cabin pressure, control the cabin pressure rate of change to an approximately constant predetermined cabin pressure rate of change in the pressuring or depressurizing direction, or directly open or close the OFV. Approximately constant may indicate within a predetermined threshold pressure range or cabin pressure rate of change range. When manual is selected and the airplane is in flight, the operator may manually open or close the OFV by selecting the appropriate OFV open/close selector position. When the selector switch is set back to hold, the cabin may go back to the manual-HOLD condition and the closed-loop pressure system of the MMC unit may maintain the cabin pressure at the pressure of the cabin when the selector switch was set to HOLD, while the aircraft is in flight.

When manual control is selected and the vehicle is in operation, the operator may manually increase or decrease the cabin pressure by selecting a desired setting, such as slow descent, fast descent, slow climb, or fast climb selector position. When the selector switch is set to slow descent, fast descent, slow climb, or fast climb selector position, the closed-loop pressure rate control system of the MMC unit may maintain the cabin pressure rate of change to the predetermined value associated with each selector switch setting. For the slow climb or fast climb selector switch settings, the closed-loop pressure rate control system of the MMC unit can limit the level of cabin pressure depressurization to a predetermined value. Thus, the MMC unit may be configured to not increase the cabin altitude above the predetermined value. For the slow descent or fast descent selector switch settings, the closed-loop pressure rate control system of the MMC unit can limit the level of cabin pressure pressurization to a predetermined value. Thus, the MMC unit may be configured to not decrease the cabin altitude beyond the predetermined value. When the selector switch is set back to hold, the cabin can go back to the manual-HOLD condition and the closed-loop pressure system of the MMC unit may maintain the cabin pressure of the cabin to the pressure when the selector switch was set to HOLD, while the vehicle is in operation.

In manual operation, when the airplane is on the ground and the airplane fuselage is not pressurized, no manual hold or slow descent or fast descent or slow climb or fast climb function is utilized; instead, the OFV remains in a fixed position as commanded by the valve selector switch 222 using the OFV close or OFV open functions. In some examples outflow valve controller 270 may include a signal indicating that the aircraft is on the ground. For example, the aircraft on ground, switch may be controlled by a landing gear sensor, indicating the weight of the aircraft is on the wheels.

Valve position, end-of-travel status, cabin pressure, and cabin pressure rate feedback to the operator are all available to be used to modulate the valve as required. Manual control may be overridden by the dump command, the altitude limit function, or the positive pressure relief valve.

The functions of FIG. 2B may also be illustrated by the following table. The ditch switch is a possible function for a cabin pressure control system that is not described in this disclosure.

TABLE I

Functions for the control of an outflow valve

| MODE Switch | DUMP Switch | DITCH Switch | OFV Function |
|---|---|---|---|
| NORM | NORM | NORM | Auto control |
| NORM | NORM | NORM | Auto control faulted, waiting on selection to MAN |
| MAN | NORM | NORM | MAN - closed-loop "hold" of cabin altitude<br>MAN - closed-loop "slow climb" of cabin altitude<br>MAN - closed-loop "fast climb" of cabin altitude<br>MAN - closed-loop "slow descent" of cabin altitude<br>MAN - closed-loop "fast descent" of cabin altitude<br>MAN - Operator control of OFV open or close |
| NORM | ON | NORM | AUTO control of dump |
| MAN | ON | NORM | OFV opens at predetermined fast climb rate to predetermined cabin altitude |
| NORM | NORM | ON | OFV closes, first ensuring ~ 0 psid, to ensure no ingress of water |
| MAN | NORM | ON | OFV closes at fixed speeds - no regard to pressure (unless DP of safety valve is reached) |

Figure 3:
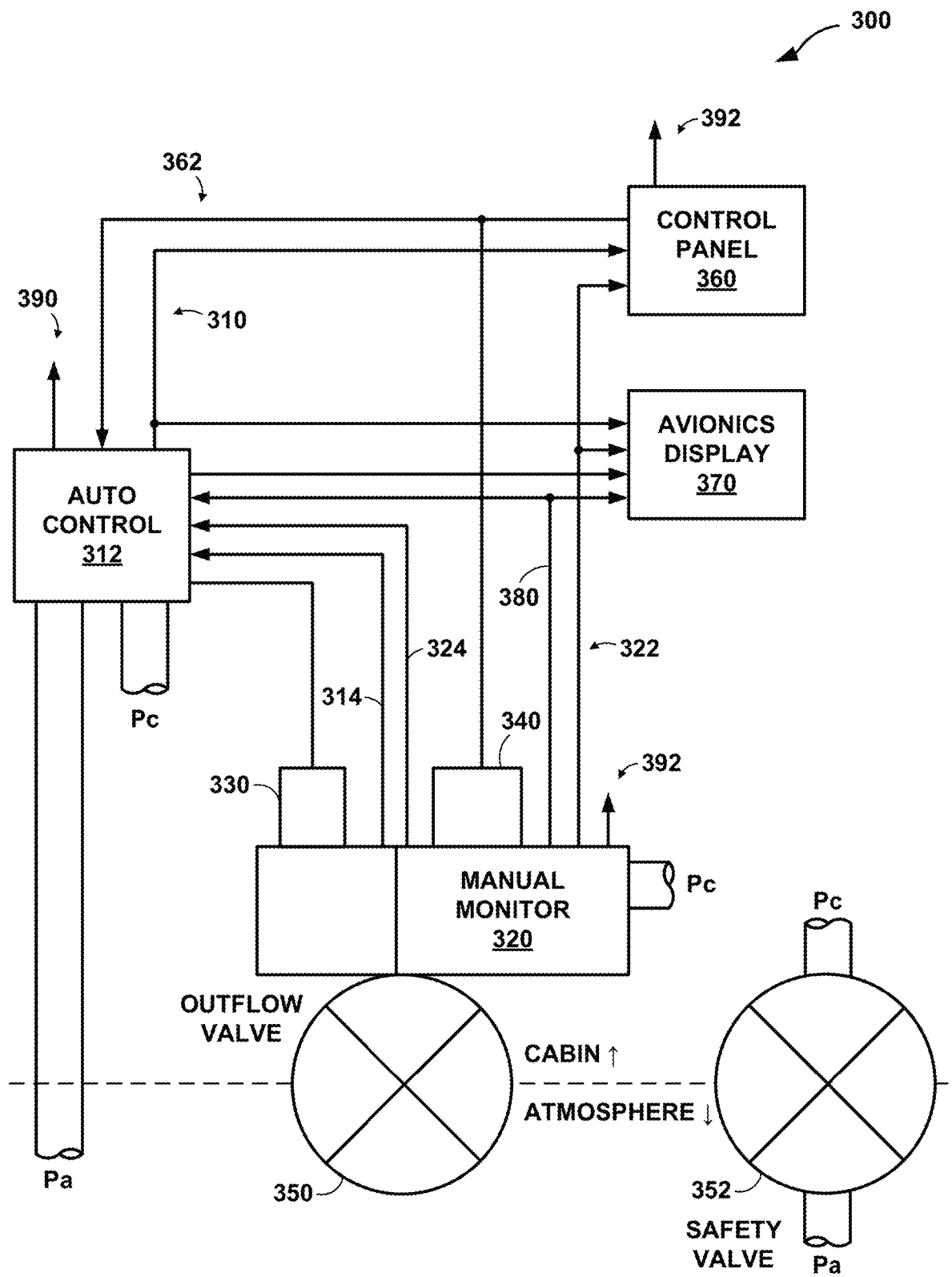
FIG. 3 is a conceptual block diagram of the system architecture of a CPCS, in accordance with some examples of this disclosure.

FIG. 3 is a conceptual block diagram of the system architecture of a CPCS, in accordance with some examples of this disclosure. CPCS 300 includes automatic control unit 312 and MMC unit 320, motors 330 and 340, outflow valve 350, safety valve 352, user control panel 360, and avionics display 370. User control panel 360 may include manual control panel 160, 200 and 260 described above in relation to FIGS. 1, 2A and 2B.

In the example of FIG. 3, automatic control unit receives power from power supply 390, which may be separate from power supply 392 for MMC unit 320 and control panel 360. Automatic control unit 312 also receives manual operation signal 362 from control panel 360, position signal 314 from the actuator that drives outflow valve 350, and altitude limit signal 324 and sensed pressure signal 380 from MMC unit 320. Automatic control unit 312 can output fault signal 310 to control panel 360 and avionics display 370 in response to detecting a fault in automatic control unit 312 or motor 330. Automatic control unit 312 may receive signals indicating the cabin pressure (labeled "Pc") and the atmospheric pressure (labeled "Pa"). Automatic control unit 312 can also control outflow valve 350 through motor 330.

MMC unit 320 receives power from power supply 392, which may be the same power supply received by control panel 360, and manual operation signal 362 from control panel 360. MMC unit 320 can output fault signal 322 to control panel 360 and/or avionics display 370 in response to detecting a fault in MMC unit 320 or motor 340. MMC unit 320 may receive a signal indicating the cabin pressure (labeled "Pc") and can control outflow valve 350 through motor 340.

Figure 4:
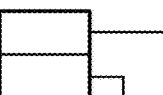
FIG. 4 is a figure that describes the combinational signals from selector switch, when codified for manual monitor controller (MMC) unit.

FIG. 4 is a figure that describes the combinational signals from selector switch 222, when codified for MMC unit 122. For example, digit 236 is the first digit of a three-digit combination signal, digit 237 is the second digit of a three-digit combination signal, and digit 238 is the third digit of a three-digit combination signal. Each of the digits are "zero" when the signal is not connected to the power bus through a normal-manual switch when normal manual switch is set to the manual position. Each of the digits are "one" when the signal is connected to the power bus through the normal-manual switch when the normal manual switch is set to the manual position.

As an example, when selector switch 222 is set to hold, the output of digits 236-238 is 000, signifying that an open circuit is present on digits 236-238. As another example, when selector switch 222 is set to slow descent, the output of digits 236-238 is 100. As another example, when selector switch 222 is set to fast descent, the output of digits 236-238 is 011. As another example, when selector switch 222 is set to slow climb, the output of digits 236-238 is 101. As another example, when selector switch 222 is set to fast climb, the output of digits 236-238 is 111. As another example, when selector switch 222 is set to OFV close, the output of digits 236-238 is 001 (e.g., the value 001 is encoded in digits 236-238). As another example, when selector switch 222 is set to OFV open, the output of digits 236-238 is 010.

A potential advantage to the codification of the selector switch inputs to the MMC unit 122 is that reduced signals are required to represent each command mode to the MMC unit 122. Another potential advantage is that a user can command a target rate of change for the cabin pressure without having to continually monitor the cabin pressure. In some examples, the user may want to increase the cabin altitude by two thousand feet. The user can select a setting for slow climb (+500 fpm) for a duration of four minutes and then select the setting for hold thereafter. MMC unit 122 may be configured to use closed-loop control to keep the cabin pressure close to the target pressure as that target decreases over the four-minute duration.

Figure 5:
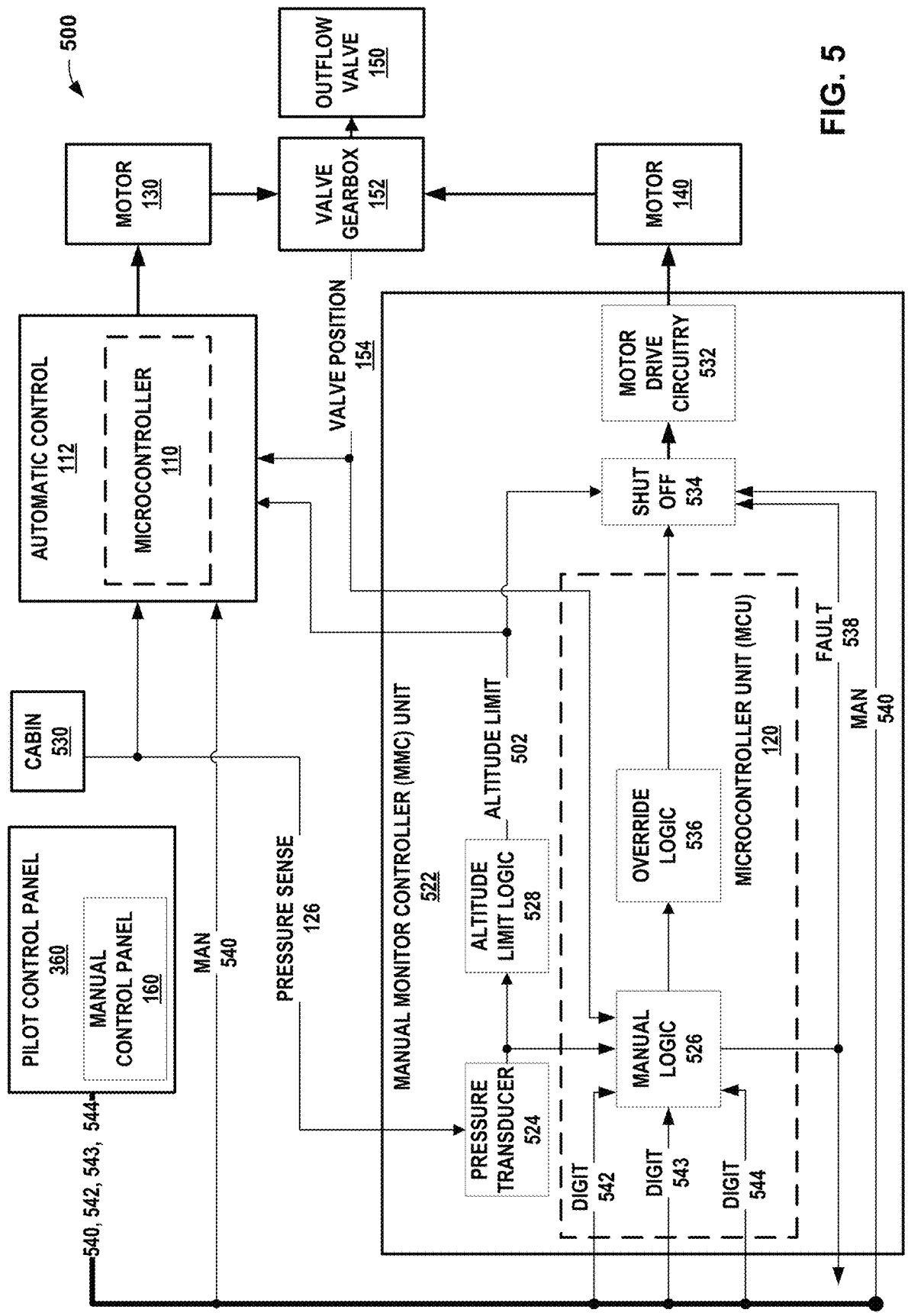
FIG. 5 is a block diagram illustrating details of an example implementation of a manual monitor controller unit as part of a CPCS according to one or more techniques of this disclosure.

FIG. 5 is a block diagram illustrating details of an example implementation of a manual monitor controller unit as part of a CPCS according to one or more techniques of this disclosure. CPCS 500 is an example implementation of CPCS 100 described above in relation to FIG. 1. Reference numbers in CPCS 500 that are the same as those in FIGS. 1-3 above have the same functions and description.

Functions of MMC unit 522 may be included in an OFV or an OFV controller, as described above in relation to FIGS. 2B and 2C. In the example of FIG. 5, MCU 120 has manual control logic 526 that performs the input processing of input signals from manual control panel 160, pressure transducer 524, altitude limit threshold detection, a built-in test unit (not shown in FIG. 5) and provides control commands to outflow valve 150 motor 140. Manual control logic 526 may include processing circuitry similar to that described above in relation to FIG. 1. Pressure transducer 524, altitude limit logic 528, and altitude limit override logic 536 may be examples of circuitry include as part of monitoring circuitry 124, described above in relation to FIG. 1.

MCU 120 may perform built-in test to detect invalid switch conditions of manual control panel 160. For example, if the manual control panel 160 provided an input signal 542 to open the outflow valve 150, but the actual manual control panel 160 mode switch was not set to manual and the manual signal 540 is not true, then the MCU 120 may flag a fault for the MMC unit 522 due to an invalid combination input of the input signal 542, 543, 544, and 540. In a similar manner, MCU 120 may perform other built-in tests to detect that the actual cabin pressure signal 530 is out of range, internal MMC unit 522 power supplies are not providing correct voltage, or motor 140 is not responding as commanded by MCU 120. In response to detecting that there is a fault in MMC unit 522, MCU 120 may be configured to set the fault signal 538 signal to true. When the MCU 120 sets the fault signal 538 to true, the shut off function 534 may disable continued operation of the motor drive circuitry 532 from operating the motor 140, ensuring that unsafe motor 140 operation does not occur.

MMC unit 522 also receives manual signal 540 from the manual control panel 160. If the manual control panel is not selected to manual mode, the shut off function 534 is disabled preventing motor drive circuitry 532 from operating the motor 140, unless the altitude limit signal 502 is true. In this similar manner, the shut off function 534 may arbitrate if the MCU 120 may operate the motor drive circuitry 532 and motor 140 for situations of faults (above), manual, or altitude limit control functionality (see below).

In the example of FIG. 5, pressure transducer 524 is a device with associated circuitry, which measures the pressure sense signal 126 and converts it to a voltage (or other signal proportionally representative of cabin pressure 530) for used by the MCU 120 manual control logic 526, and also by the altitude limit logic 528. Pressure transducer 524 may include any type of pressure sensor. Cabin pressure 530 is an example of Pc, described above in relation to FIG. 3.

Manual control logic 526 may be configured to control outflow valve 150 based on commands received from control panel 360 as digits 542-544. For example, in response to a switch in control panel 360 being set to a slow descent rate position (e.g., the digits 100), manual control logic 526 may be configured to control the cabin altitude to descend the cabin altitude at the slow descent rate. In response to the switch being set to a fast descent rate position (e.g., the digits 011), manual control logic 526 may be configured to control the cabin altitude to descend the cabin altitude at the fast descent rate. In response to the switch being set to the slow climb rate position (e.g., the digits 101), manual control logic 526 may be configured to control the cabin altitude to climb the cabin altitude at a slow climb rate.

In response to the switch being set to the fast climb rate position (e.g., the digits 111), manual control logic 526 may be configured to control the cabin altitude to climb the cabin altitude at a fast climb rate. For the slow and fast climb positions, altitude limit logic 528 may be configured to maintain the cabin altitude below a predetermined value that represents altitude limit 502 (e.g., fourteen to fifteen thousand feet). In response to the switch being set to the fast OFV close position (e.g., the digits 001), manual control logic 526 may be configured to control the OFV to move rapidly towards the closing direction. In response to the switch being set to the fast OFV open position (e.g., the digits 010), manual control logic 526 may be configured to control the OFV to move rapidly towards the opening direction until the cabin altitude reaches a limited value. Thus, digits 542-544 may encode a hold command, a rate of change command, or manual adjust command for outflow valve 150.

In operation, altitude limit logic 528 may be configured to utilize the cabin pressure signal from pressure transducer 524 to determining whether the actual cabin pressure 530 is less than the pre-programmed altitude limit threshold pressure. The altitude limit threshold pressure may be pre-programmed into the MMC unit 522 by using analog circuitry, digital potentiometer, non-volatile memory, or other mechanism that stores the altitude limit threshold pressure. In response to determining that the actual cabin pressure 530 is less than the altitude limit threshold pressure, altitude limit logic 528 may be configured to activate and set altitude limit 502 signal to true. In response to determining that altitude limit signal 502 is true, automatic control 112 may be configured to receive altitude limit signal 502 and identify the condition to the airplane for flight crew situational awareness. When altitude limit signal 502 is true, automatic control 112 motor control circuitry may be configured to disable and no longer operate motor 130.

When altitude limit signal 502 is true, shut off function 534 may receive signal 502 and enable the motor 140 to be operated by the MCU 120 even though the manual signal 540 is not true. MMC unit 522 motor drive circuitry 532 can become enabled via motor 140 shut off function 534 when the signal 502 is true at shut off function 534. This allows MCU 120 to operate motor 140 to the closed direction to reduce the amount of fluid flow out of the cabin. MCU 120 may be configured to also utilize cabin pressure signal 530 from pressure sense 126 to compare against a known altitude limit threshold pressure. In response to determining that the cabin pressure signal 530 is less than the known altitude limit threshold pressure, MCU 120 may be configured to actively control motor 140 in the closed direction using the motor drive circuitry 532 which was enabled by the shut off function 534, when the altitude limit logic 528 sets the altitude limit signal 502 to true.

The circuitry of MMC unit 522 unit hosts pressure transducer 524 and performs the altitude limit output 502 and altitude limit override logic 536 when the cockpit altitude exceeds a predetermined value (e.g. 15,000 feet). Thus, MMC unit 522 has its own power supply to support this function as described above in relation to FIGS. 3 and 4.

In the event of an altitude limit event, MMC unit 522 provides a signal 502 to the automatic control unit 112, which may include an automatic motor control (AMC) unit. The altitude limit event signal 502 may disable the automatic motor control of motor 130. MMC unit 522 also drives the manual motor 140 closed to limit further depressurization. The altitude limit closing speed may be "tuned" the to limit the initial overshoot to the altitude limit set-point and then "regulate" to that set-point.

The MMC circuit may be configured to perform manual hold, manual slow climb, manual fast climb, manual slow descent, manual fast descent, manual OFV open, or manual OFV close or DUMP of OFV 150 if the flight deck mode switches in manual control panel 160 of user control panel 360 are set to MAN, and the selector switch of user control panel 360 is set to hold, slow climb, fast climb, slow descent, fast descent, OFV close or OFV open; or DUMP. During MAN-OFV open control or MAN-OFV close control, OFV 150 is opened or closed to a scheduled motor speed. The first few seconds of MAN-OFV open control or MAN-OFV close control may be a slow motor speed, then MCU 120 may be configured to command the remaining valve opening or closing at a higher motor speed. One reason for the slow-to-fast schedule is to limit the initial pressurization/depressurization rate prior to ultimately closing/opening the OFV.

If required, altitude limit can override the OFV open or slow climb or fast climb or DUMP function and limit the cockpit altitude. If the flight is above 15,000 feet, for example, after an initial overshoot the cockpit altitude may be limited to 15,000 feet, which is the US regulatory limit above which passengers require oxygen. In other examples, altitude limit override logic 536 can be utilized to allow the DUMP function to completely open the OFV, even when the aircraft is above the 15,000 ft altitude limit threshold.

Figure 6:
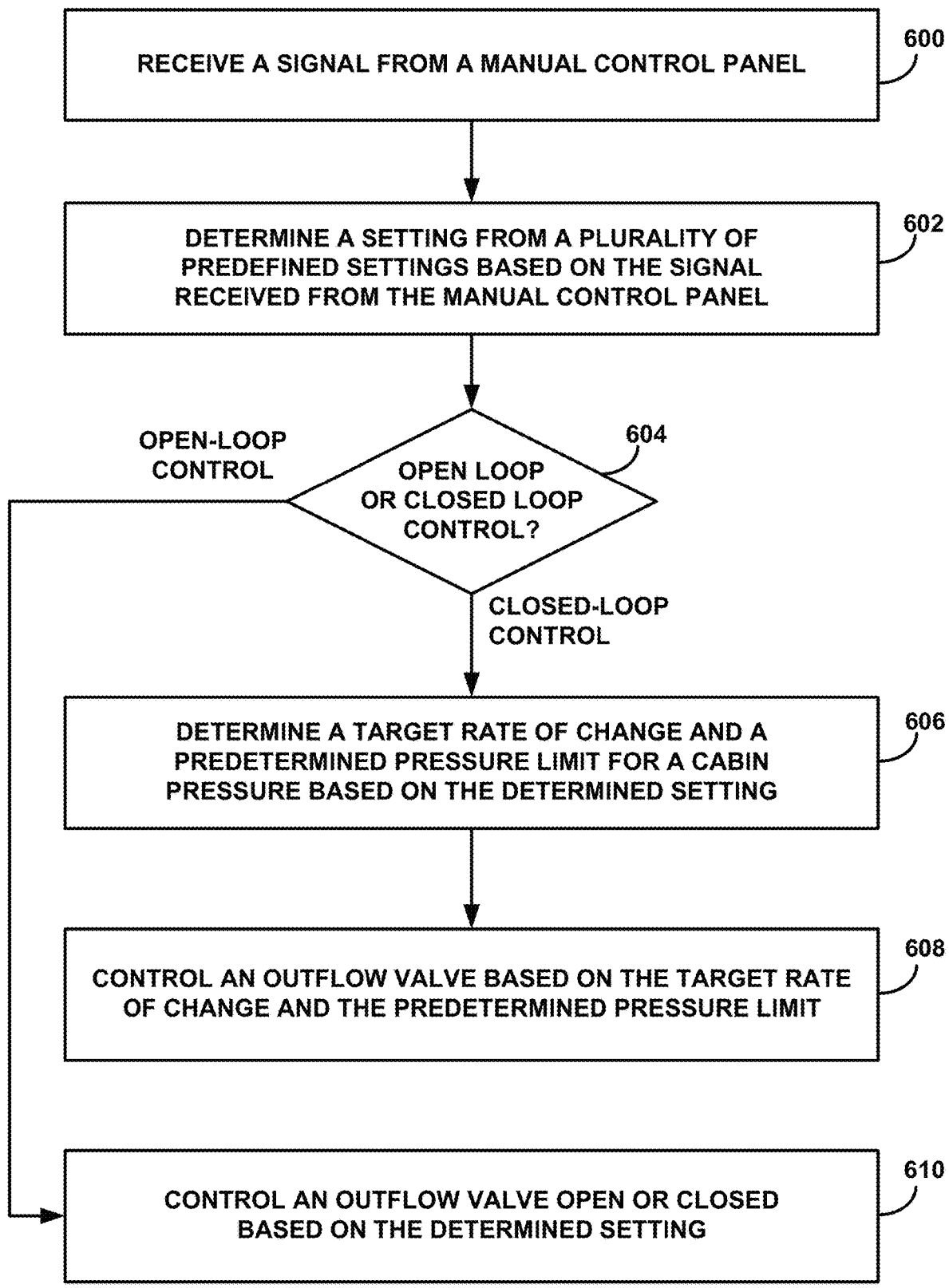
FIG. 6 is a flowchart illustrating an example operation of a manual control system according to one or more techniques of this disclosure.

FIG. 6 is a flowchart illustrating an example operation of a manual control system according to one or more techniques of this disclosure. The blocks of FIG. 6 will be described in terms of outflow valve controller 270 in FIG. 2B, unless otherwise noted.

Outflow valve controller 270 receives a signal from the manual control panel 260, where manual control panel 260 includes selector switch 202 (600). The signal may be a digital signal or an analog signal. In the example shown in FIG. 2B, the signal includes digits 236-238. Outflow valve controller 270 then determines a setting from a plurality of predefined settings based on the signal received from manual control panel 260 (602). For a three-bit digital number, there may be up to eight predefined settings. The settings may include one or more settings for increasing the cabin pressure using closed-loop pressure control and one or more settings for decreasing the cabin pressure using closed-loop pressure control and one or more settings to directly open or close the outflow valve using open-loop motor control.

Outflow valve controller 270 determines whether the setting is associated with closed-loop control or open-loop control (604). In some examples, manual control panel 260 includes only closed-loop control settings, where each closed-loop control setting is associated with a target rate of change. In the example shown in FIG. 2A, however, selector switch 202 includes two open-loop control settings: OFV close and OFV open. Outflow valve controller 270 may be configured to perform open-loop control without a feedback pressure signal, and outflow valve controller 270 may be configured to perform closed-loop control based on a feedback pressure signal.

In response to determining that the setting is associated with closed-loop control (e.g., slow descent), outflow valve controller 270 determines a target rate of change and a predetermined pressure limit for a cabin pressure based on the determined setting (606). Outflow valve controller 270 can also determine the current cabin pressure and the current cabin pressure rate of change in order to determine whether current pressure and pressure rate of change values are satisfying the target rate of change and the predetermined pressure limit. Outflow valve controller 270 controls the outflow valve based on the target rate of change and the predetermined pressure limit (608).

In response to determining that the actual cabin pressure is less than a target pressure value, outflow valve controller 270 can close the outflow valve. In response to determining that the actual cabin pressure is greater than a target pressure value, outflow valve controller 270 can open the outflow valve. In response to determining that the setting is associated with open-loop control, outflow valve controller 270 controls the outflow valve open or closed based on the determined setting (610). In some examples, open-loop control does not include any sensed feedback, so outflow valve controller 270 may be configured to drive a motor to increase or decrease the airflow through the outflow valve and not control the outflow valve to achieve a specific cabin pressure. In an open-loop control setting, outflow valve controller 270 may be configured to increase or decrease the opening or airflow of the outflow valve, rather than controlling the rate of change of the cabin altitude or cabin pressure.

In one or more examples, the functions described above may be implemented in hardware, software, firmware, or any combination thereof. For example, the MMC unit 122, MMC unit 320, outflow valve controller 270, automatic control unit 112, avionics 248 and other components that including processing circuitry may be implemented in hardware, software, firmware, or any combination thereof. If implemented in software, the functions may be stored on a tangible computer-readable storage medium and executed by a processor or hardware-based processing unit.

Instructions may be executed by one or more processors, such as one or more digital signal processors, general purpose microprocessors, application-specific integrated circuits, field-programmable gate arrays, or other equivalent integrated or discrete logic circuitry. Accordingly, the term "processor," and "processing circuitry" as used herein, such as may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described.

The following numbered aspects demonstrate one or more aspects of the disclosure.

Aspect 1. A method for controlling cabin pressure includes receiving a signal from a selector switch; determining a setting from a plurality of predefined settings based on the signal received from the selector switch; determining a target rate of change for a cabin pressure based on a setting selected by the user; and controlling the outflow valve based on the target rate of change.

Aspect 2. A cabin pressure control and monitoring system includes an outflow valve; a manual control panel comprising a selector switch and configured to generate a signal indicating a position of the selector switch; and a controller configured to receive the signal from the manual control panel; determine a setting from a plurality of settings based on the signal received from the manual control panel; determine a target rate of change for a cabin pressure based on a setting selected by the user; and control the outflow valve based on the target rate of change.

Aspect 3. A cabin pressure control and monitoring system includes an outflow valve; a selector switch comprising a plurality of settings, wherein the selector switch is configured to receive user input based on which setting of the plurality of settings is selected by a user; and a controller configured to perform the method of aspect 1.

Aspect 4. A cabin pressure control and monitoring system includes an outflow valve; a selector switch comprising a plurality of settings, wherein the selector switch is configured to receive user input based on which setting of the plurality of settings is selected by a user; and a controller configured to determine a target rate of change for a cabin pressure based on a setting selected by the user; and control the outflow valve based on the target rate of change.

Aspect 5. A cabin pressure control and monitoring system includes an outflow valve configured to open to reduce a cabin pressure; an input device configured to receive user input; a controller configured to determine a commanded rate of change for the cabin pressure based on the user input; and control the outflow valve based on the commanded rate of change.

Aspect 6. A cabin pressure control and monitoring system of the previous aspects or any combination thereof, wherein the controller is further configured to drive the outflow valve to a first position based on the commanded rate of change; receive a sensed signal indicating the cabin pressure; determine whether the cabin pressure is less than, greater than, or equal to a cabin pressure value for achieving the commanded rate of change; and drive the outflow valve to a second position based on whether the cabin pressure is less than, greater than, or equal to a cabin pressure value for achieving the commanded rate of change.

Aspect 7. A cabin pressure control and monitoring system of the previous aspects or any combination thereof, wherein the controller is configured to control the outflow valve based on the commanded rate of change using closed-loop control.

Aspect 8. A cabin pressure control and monitoring system of the previous aspects or any combination thereof, wherein the controller is configured to use closed-loop control to maintain the pressure rate of change of the cabin pressure.

Aspect 9. A cabin pressure control and monitoring system of the previous aspects or any combination thereof, wherein to use closed-loop control, the controller is configured to control the outflow valve to achieve the target rate of change for the cabin pressure.

Aspect 10. A cabin pressure control and monitoring system of the previous aspects or any combination thereof, wherein the input device is configured to output a signal indicating the commanded rate of change.

Aspect 11. A cabin pressure control and monitoring system of the previous aspects or any combination thereof, wherein the input device has a plurality of settings, where each setting is associated with a particular rate of change.

Aspect 12. A cabin pressure control and monitoring system of the previous aspects or any combination thereof, wherein a setting of the input device is associated with no change in the cabin pressure.

Aspect 13. A cabin pressure control and monitoring system of the previous aspects or any combination thereof, wherein a setting of the input device is associated with a rate of increase of the cabin pressure.

Aspect 14. A cabin pressure control and monitoring system of the previous aspects or any combination thereof, wherein a setting of the input device is associated with a rate of decrease of the cabin pressure.

Aspect 15. A cabin pressure control and monitoring system of the previous aspects or any combination thereof, wherein a first setting of the input device is associated with a first rate of increase of the cabin pressure, and wherein a second setting of the input device is associated with a second rate of increase of the cabin pressure that is greater than the first rate.

Aspect 16. A cabin pressure control and monitoring system of the previous aspects or any combination thereof, wherein a first setting of the input device is associated with a first rate of decrease of the cabin pressure, and wherein a second setting of the input device is associated with a second rate of decrease of the cabin pressure that is greater than the first rate.

Aspect 17. A cabin pressure control and monitoring system of the previous aspects or any combination thereof, wherein the controller is configured to determine a target rate of change for the cabin pressure based on a digital number received from the selector switch.

Aspect 18. A cabin pressure control and monitoring system of the previous aspects or any combination thereof, wherein the controller is configured to determine a target rate of change for the cabin pressure by at least applying a digital number received from the selector switch to a mapping table; or applying the digital number received from the selector switch to a look-up table.

Aspect 19. A cabin pressure control and monitoring system of the previous aspects or any combination thereof, further comprising an electric motor configured to drive the outflow valve based on signals received from the controller.

Aspect 20. A cabin pressure control and monitoring system of the previous aspects or any combination thereof, wherein the controller is configured to control an electric motor to adjust the position of the outflow valve to maintain a target rate of change.

Aspect 21. A method for controlling cabin pressure includes receiving a signal from a manual control panel, wherein a value encoded in the signal is dependent on a position of a selector switch. The method also includes determining a target rate of change for a cabin pressure based on the value encoded in the signal. The method further includes controlling an outflow valve based on the target rate of change.

Aspect 22. The method of aspect 21, further including receiving a feedback signal from a pressure sensor.

Aspect 23. The method of aspect 21 or aspect 22, wherein controlling the outflow valve is based on a feedback signal to achieve the target rate of change.

Aspect 24. The method of aspects 21-23 or any combination thereof, further including causing a motor to drive the outflow valve to a first position based on the target rate of change.

Aspect 25. The method of aspects 21-24 or any combination thereof, further including determining whether the cabin pressure is less than, greater than, or equal to a cabin pressure value for achieving the target rate of change based on a feedback signal.

Aspect 26. The method of aspects 21-25 or any combination thereof, further including causing the motor to drive the outflow valve to a second position based on whether the cabin pressure is less than, greater than, or equal to a cabin pressure value for achieving the target rate of change.

Aspect 27. The method of aspects 21-26 or any combination thereof, further including determining a setting from a plurality of settings based on the value encoded in the signal, wherein each setting of the plurality of settings is associated with a particular rate of change.

Aspect 28. The method of aspects 21-27 or any combination thereof, further including determining a setting from a plurality of settings based on the value encoded in the signal, wherein a first setting of the plurality of settings is associated with a rate of increase of the cabin pressure.

Aspect 29. The method of aspects 21-28 or any combination thereof, further including determining a setting from a plurality of settings based on the value encoded in the signal, wherein a second setting of the plurality of settings is associated with a rate of decrease of the cabin pressure.

Aspect 30. The method of aspects 21-29 or any combination thereof, further including determining a setting from a plurality of settings based on the value encoded in the signal, wherein a third setting of the plurality of settings is associated with zero rate of change of the cabin pressure.

Aspect 31. The method of aspects 21-30 or any combination thereof, further including determining a hold setting based on the value encoded in the signal.

Aspect 32. The method of aspects 21-31 or any combination thereof, further including controlling the outflow valve to maintain the cabin pressure at a cabin pressure setpoint in response to determining a hold setting.

Aspect 33. The method of aspects 21-32 or any combination thereof, further including determining an open-loop control setting based on the value encoded in the signal.

Aspect 34. The method of aspects 21-33 or any combination thereof, further including performing open-loop control of the outflow valve in response to determining a open-loop control setting.

Aspect 35. The method of aspects 21-34 or any combination thereof, wherein receiving the signal includes receiving a digital number as a set of parallel bits from the manual control panel.

Aspect 36. The method of aspects 21-35 or any combination thereof, wherein determining the target rate of change is based on a digital number received from the manual control panel.

Aspect 37. A cabin pressure control and monitoring system includes an outflow valve and a manual control panel comprising a selector switch and configured to generate a signal, wherein a value encoded in the signal is dependent on a position of the selector switch. The cabin pressure control and monitoring system also includes a controller configured to receive the signal from the manual control panel, determine a target rate of change for a cabin pressure based on the value encoded in the signal, and control the outflow valve based on the target rate of change.

Aspect 38. The cabin pressure control and monitoring system of aspect 37, wherein the controller is configured to perform the method of aspects 1 and 21-36 or any combination thereof Aspect 39. The cabin pressure control and monitoring system of aspect 37 or aspect 38 or any combination thereof, further including a first motor configured to operate the outflow valve, a second motor configured to operate the outflow valve, and a first microcontroller configured to automatically control the first motor based on the cabin pressure. The controller comprises a second microcontroller configured to control the second motor based on the target rate of change. A type of the first microcontroller is different than a type of the second microcontroller.

Aspect 40. The cabin pressure control and monitoring system of aspect 39, wherein a design of the first microcontroller is different than a design of the second microcontroller.

Aspect 41. The cabin pressure control and monitoring system of aspect 39 or aspect 40 or any combination thereof, wherein the first microcontroller operates independently of the second microcontroller.

Aspect 42. The cabin pressure control and monitoring system of aspects 39-41 or any combination thereof, wherein the first microcontroller is configured to receive power from a first power supply, and the second microcontroller is configured to receive power from a second power supply, the second power supply being different than the first power supply.

Aspect 43. The cabin pressure control and monitoring system of aspects 39-42 or any combination thereof, further including a first pressure sensor and a second pressure sensor separate from the first pressure sensor, wherein the first microcontroller is configured to automatically control the first motor based on an output of the first pressure sensor, and the second microcontroller is configured to perform closed-loop control of the second motor based on the target rate of change and further based on an output of the second pressure sensor.

Aspect 44. A system comprising means for performing each step of the method of aspects 1 and 21-36 or any combination thereof.

Aspect 45. A device comprising a computer-readable medium having executable instructions stored thereon, configured to be executable by processing circuitry for causing the processing circuitry to perform the method of aspects 1 and 21-36 or any combination thereof.

Various examples of the disclosure have been described. These and other examples are within the scope of the following claims.

What is claimed is:

1. A cabin pressure control and monitoring system comprising:
   an outflow valve;
   a manual control panel comprising a selector switch and configured to generate a signal, wherein a value encoded in the signal is dependent on a position of the selector switch selected from a plurality of positions for the selector switch, wherein the plurality of positions for the selector switch comprise a fast ascent position, a slow ascent position, a fast descent position, a slow descent position, an outflow valve (OFV) open position, and an OFV closed position; and
   a controller configured to:
      receive the signal from the manual control panel;
      determine whether to control the outflow valve using closed-loop control or open-loop control based on the signal from the manual control panel;
      in response to determining to control the outflow valve using the closed-loop control:
         determine a target rate of change for a cabin pressure based on the value encoded in the signal, wherein a target rate of change associated with the fast ascent position corresponds to a first depressurization rate, a target rate of change associated with the slow ascent position corresponds to a second depressurization rate that is lower than the first depressurization rate, a target rate of change associated with the fast descent position corresponds to a first pressurization rate, and a target rate of change associated with the slow descent position corresponds to a second pressurization rate that is lower than the first pressurization rate; and
         control the outflow valve based on the target rate of change; and
      in response to determining to control the outflow valve using the open-loop control:
         move the outflow valve into a more open position in response to the value encoded in the signal corresponding to the OFV open position; and
         move the outflow valve into a more closed position in response to the value encoded in the signal corresponding to the OFV closed position.

2. The cabin pressure control and monitoring system of claim 1, wherein,
   in response to the position of the selector switch being one of the fast ascent position, the slow ascent position, the fast descent position, or the slow descent position, the controller is configured to receive a feedback signal from a pressure sensor,
   to control the outflow valve when the position of the selector switch is one of the fast ascent position, the slow ascent position, the fast descent position, or the slow descent position, the controller is configured to control the outflow valve based on the feedback signal to achieve the target rate of change, and
   in response to the position of the selector switch being one of the OFV open position or the OFV closed position, the controller is configured to control the outflow valve independent of the feedback signal.

3. The cabin pressure control and monitoring system of claim 2, wherein the controller is further configured to:
   in response to determining to control the outflow valve using the closed-loop control:
      cause a motor to drive the outflow valve to a first position based on the target rate of change;
      determine whether the cabin pressure is less than, greater than, or equal to a cabin pressure value for achieving the target rate of change based on the feedback signal; and
      cause the motor to drive the outflow valve to a second position based on whether the cabin pressure is less than, greater than, or equal to the cabin pressure value.

4. The cabin pressure control and monitoring system of claim 1,
   wherein the controller is configured to determine a setting from a plurality of settings based on the value encoded in the signal, and
   wherein each setting of the plurality of settings is associated with a particular rate of change.

5. The cabin pressure control and monitoring system of claim 4,
   wherein a first setting of the plurality of settings is associated with a rate of increase of the cabin pressure,
   wherein a second setting of the plurality of settings is associated with a rate of decrease of the cabin pressure, and
   wherein a third setting of the plurality of settings is associated with zero rate of change of the cabin pressure.

6. The cabin pressure control and monitoring system of claim 1, wherein the controller is configured to:
   determine a hold setting based on the value encoded in the signal; and control the outflow valve to maintain the cabin pressure at a cabin pressure setpoint in response to determining the hold setting.

7. The cabin pressure control and monitoring system of claim 1,
wherein each of the plurality of positions for the selector switch has a corresponding value, and the value corresponding to the position for the selector switch is encoded in the signal as a digital number, and
wherein the controller is configured to determine the target rate of change based on the digital number received from the manual control panel.

8. The cabin pressure control and monitoring system of claim 7, wherein the manual control panel is configured to transmit the digital number as a set of parallel bits to the controller.

9. The cabin pressure control and monitoring system of claim 1, further comprising:
a first motor configured to operate the outflow valve;
a second motor configured to operate the outflow valve;
a first microcontroller configured to automatically control the first motor based on the cabin pressure; and
wherein the controller comprises a second microcontroller configured to control the second motor based on the target rate of change, and
wherein a type of the first microcontroller is different than a type of the second microcontroller.

10. The cabin pressure control and monitoring system of claim 9,
wherein a design of the first microcontroller is different than a design of the second microcontroller, and
wherein the first microcontroller operates independently of the second microcontroller.

11. The cabin pressure control and monitoring system of claim 9,
wherein the first microcontroller is configured to receive power from a first power supply, and
wherein the second microcontroller is configured to receive power from a second power supply, the second power supply being different than the first power supply.

12. The cabin pressure control and monitoring system of claim 9, further comprising a first pressure sensor and a second pressure sensor separate from the first pressure sensor,
wherein the first microcontroller is configured to automatically control the first motor based on an output of the first pressure sensor, and
wherein the second microcontroller is configured to control the second motor based on the target rate of change and further based on an output of the second pressure sensor.

13. The cabin pressure control and monitoring system of claim 1, wherein the controller is further configured to:
determine that a pressure in the cabin has reached a pressure limit; and
in response to determining that the pressure in the cabin has reached the pressure limit, override the target rate of change for the cabin pressure determined based on the value encoded in the signal.

14. The cabin pressure control and monitoring system of claim 1, wherein the selector switch comprises a rotatable knob and the manual control panel further comprises a dump button separate from the rotatable knob, wherein activation of the dump button causes the controller to control the outflow valve to equalize the pressure in the cabin with a pressure outside the cabin.

15. The cabin pressure control and monitoring system of claim 1, wherein
the plurality of positions for the selector switch further comprises a hold position, and
in response to determining that the value encoded in the signal corresponds to the hold position, the controller is configured to:
determine a setpoint pressure for the cabin; and
use the closed-loop control to maintain the cabin pressure at the setpoint pressure.

16. The cabin pressure control and monitoring system of claim 15, wherein the controller is configured to determine the setpoint pressure based on a measured pressure at a time the selector switch is moved to the hold position.

17. A method for controlling cabin pressure, the method comprising:
receiving a signal from a manual control panel, wherein a value encoded in the signal is dependent on a position of a selector switch selected from a plurality of positions for the selector switch, wherein the plurality of positions for the selector switch comprise a fast ascent position, a slow ascent position, a fast descent position, a slow descent position, an outflow valve (OFV) open position, and an OFV closed position;
in response to determining to control the outflow valve using closed-loop control:
determining a target rate of change for a cabin pressure based on the value encoded in the signal, wherein a target rate of change associated with the fast ascent position corresponds to a first depressurization rate, a target rate of change associated with the slow ascent position corresponds to a second depressurization rate that is lower than the first depressurization rate, a target rate of change associated with the fast descent position corresponds to a first pressurization rate, a target rate of change associated with the slow descent position corresponds to a second pressurization rate that is lower than the first pressurization rate; and
controlling an outflow valve based on the target rate of change; and
in response to determining to control the outflow valve using open-loop control:
moving the outflow valve into a more open position in response to the value encoded in the signal corresponding to the OFV open position; and
moving the outflow valve into a more closed position in response to the value encoded in the signal corresponding to the OFV closed position.

18. The method of claim 17, further comprising:
in response to determining to control the outflow valve using the closed-loop control, receiving a feedback signal from a pressure sensor, wherein controlling the outflow valve is based on the feedback signal to achieve the target rate of change.

19. The method of claim 17, further comprising:
determining a hold setting based on the value encoded in the signal; and
controlling the outflow valve to maintain the cabin pressure at a cabin pressure setpoint in response to determining the hold setting.

20. The method of claim 17,
wherein receiving the signal comprises receiving a digital number as a set of parallel bits from the manual control panel, and wherein determining the target rate of change is based on the digital number received from the manual control panel.

\* \* \* \* \*